Nov. 1, 1927.

L. SCHOLLER 1,647,935

MOTOR VEHICLE LIFT

Filed Nov. 10, 1926    2 Sheets-Sheet 1

INVENTOR.
LOUIS SCHOLLER,
BY Bernard F. Garvey
ATTORNEY

Patented Nov. 1, 1927.

1,647,935

UNITED STATES PATENT OFFICE.

LOUIS SCHOLLER, OF FRESNO, CALIFORNIA.

MOTOR-VEHICLE LIFT.

Application filed November 10, 1926. Serial No. 147,560.

The present invention consists of a motor vehicle lift for the purpose of raising a deflated tire from the ground to correspondingly increase the space between the vehicle axle and the ground to facilitate insertion of a jack beneath the axle.

In the use of balloon tires it is well-known that the deflation of a tire permits the axle to gravitate into relatively close proximity to the ground with the result that it is difficult, and sometimes impossible, to place a jack in the space afforded between the axle and ground; it is consequently the purport of the present invention to devise a means which permits the axle to be elevated to the desired height so that the jack or other support may be expeditiously positioned beneath the axle.

A coordinate object of the invention is to provide a lift of this character which is foldable so as to occupy a minimum amount of space to permit its being carried in the tool box or tool compartment of the automobile.

Other objects of the invention will be apparent from the following description of the present preferred form of the invention taken in connection with the accompanying drawings wherein:—

Figure 1:
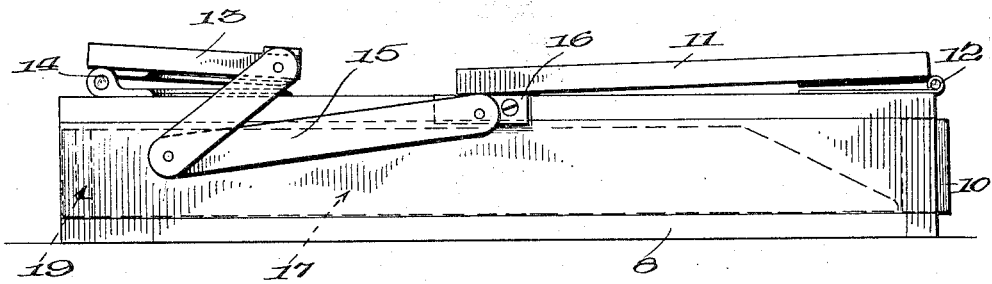
Fig. 1 is a side elevational view of a lift constructed in accordance with the present invention showing the same in a collapsed position.
Figure 2:
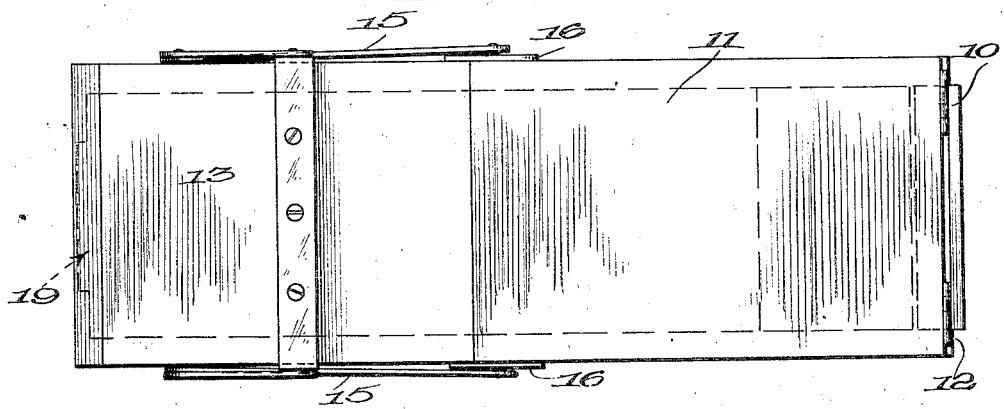
Fig. 2 is a top plan view of the same.
Figures 3, 4:
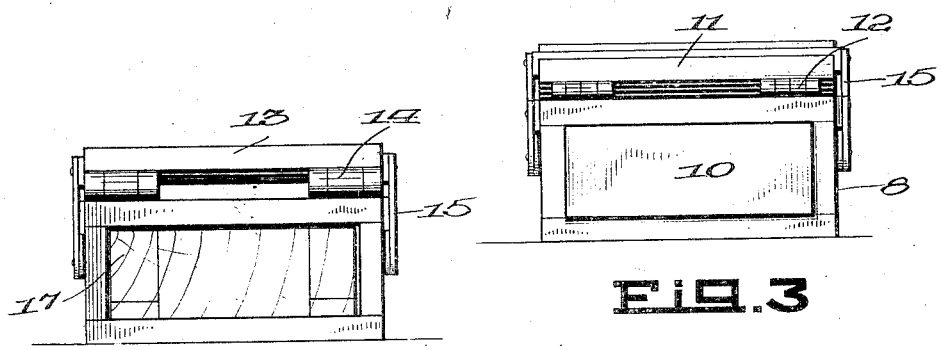
Fig. 3 is an end elevational view of the lift in collapsed position looking from the end approached by the deflated tire.
Fig. 4 is a similar view looking at the opposite end of the lift.

The lift constructed in accordance with the present invention consists of a body generally designated 8 which in the present instance is hollow and of oblong configuration. By making the body hollow a compartment 9 is provided, one end of which is closed by a block 10, the latter protruding beyond the end of the body 8. A runway 11 is hingedly mounted, as indicated at 12, on the closed end of the body 8. The hinge means 12 consists of a pair of strap hinges, one part of each hinge being detachably secured to the top of the body 8, while the other part of each hinge is detachably engaged to one face of the runway 11.

The joints of the hinges project upwardly from the top of the body 8 and project over the closed end thereof. Consequently if the runway 11 is permitted to gravitate downwardly for the purpose of engaging the free end thereof with the ground, the inner end of the runway is permitted to rest upon the protruding end of the block 10 to relieve the hinges from strain.

The opposite end of the body 8, from that which carries the runway 11, is equipped with an abutment 13, one marginal edge of which is hingedly engaged, through the medium of a pair of hinges 14, with the upper face of the body 8. The portions of the hinges 14 which are mounted upon the abutment 13 project outwardly from the latter so as to provide guards 14' for a purpose hereinafter set forth. When the abutment 13 is in an operative position it is at right angles to the top of the body 8 and is held in this position through the medium of break-joint hinges 15, which are secured to the opposite sides of the abutment 13, and to plates 16 which are detachably mounted on the opposite sides of the body 8 approximately midway the ends of the latter.

Figure 6:
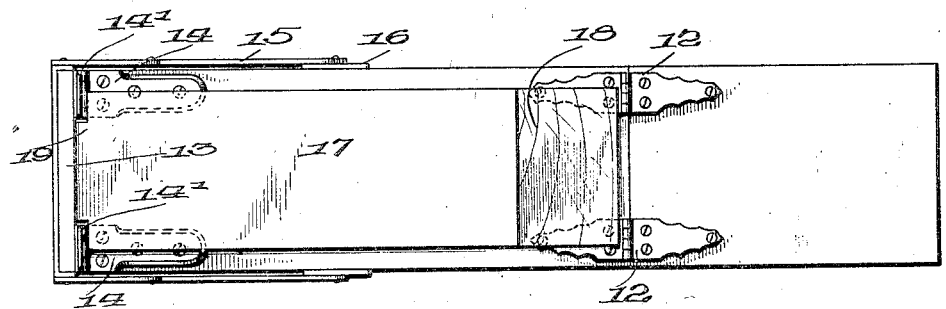
Fig. 6 is a top plan view thereof.
Figure 7:
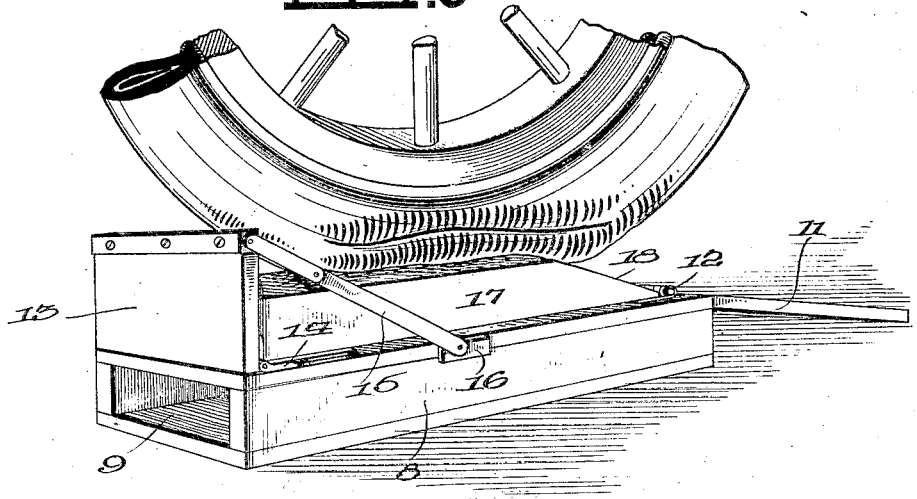
Fig. 7 is a perspective view of the lift in an operative position and illustrating its application.

For the purpose of receiving the deflated tire, when the latter rides upwardly on the runway 11, a block or slipper 17 is provided, the opposite ends of which fall short of the opposite ends of the body 8. One end of the slipper is beveled or inclined, as indicated at 18, so that the wheel will travel uninterruptedly up the runway 11 onto the beveled face 18 of the slipper and into engagement with the upper face of the slipper as illustrated in Fig. 6. Further movement of the wheel is limited by the abutment 13. The slipper is held from longitudinal movement by the upwardly projecting joints of the hinges 12, at one end, and by the abutment 13 and hinges 14 at the opposite end. The abutment end of the slipper 17 has portions of its terminal removed to provide a tongue 19 which fits between the guards 14' heretofore described.

Figure 5:
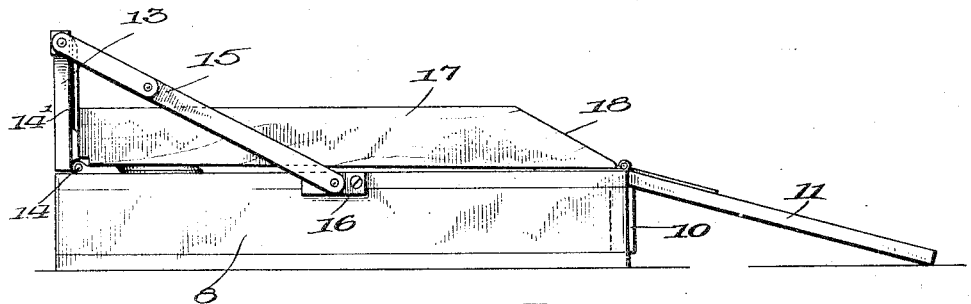
Fig. 5 is a side elevational view of the lift in an operative position.

When the lift is not in use the slipper 17 is mounted in the compartment 9, as indicated by the dotted lines in Fig. 1, and the runway 11 and abutment 13 are folded downwardly into engagement with the top face of the body 8. When it is desired to use the lift the runway 11 is urged downwardly into the position shown in Fig. 5 and the abutment 13 moved upwardly into the position also shown in Fig. 5. The slipper 17 is then fitted on top of the body 8 in the manner heretofore described and the entire lift placed in close proximity to the deflated tire of the vehicle. If the front tire is deflated the vehicle is moved in a forward direction until the deflated tire rides upwardly into a position superimposed on the slipper 17. If a back tire is deflated the vehicle is moved rearwardly to permit the deflated tire to ride upwardly on the runway 11 into superimposed position on the slipper 17. When the wheel is in this position the axle is elevated a very appreciable distance above the ground, permitting the placement of an ordinary jack, such as usually comes as standard equipment with the vehicle, beneath the axle. Or if a jack is not available a block of wood, bricks or other means may be used in order to retain the deflated tire in a position spaced from the ground until the tire has been changed.

It is of course to be understood that the device of the present invention may be made of wood, metal or other suitable material, and although I have herein described a preferred form of the invention it is nevertheless to be understood that various changes may be made therein within the scope of the claims hereto appended.

What I claim is:—

1. A motor vehicle lift including a hollow body equipped at one end with a runway and at the opposite end with an abutment, a block, engageable with the top of said body and insertable, when not in use, within the body, said runway and abutment being foldable into engagement with the top of the body when not in use.

2. A motor vehicle lift including a hollow body, a block inserted in one end of the body to form a closure for the latter, a portion of which projects beyond the end of the body, an abutment hingedly mounted on one end of the body and a runway hingedly mounted on the opposite end of the latter above the projecting end of the closure block to engage the latter when in an operative position, and a wheel block adapted to be superimposed on said body and provided with an inclined end corresponding with the inclination of the runway to serve as a continuation of the latter, said wheel block being insertable in the hollow body when not in use.

LOUIS SCHOLLER.